US011924598B2

(12) United States Patent
Hardi et al.

(10) Patent No.: US 11,924,598 B2
(45) **Date of Patent: *Mar. 5, 2024**

(54) INTERCHANGEABLE EAR CUSHIONS FOR HEADPHONES

(71) Applicant: Muzik Inc., Raleigh, NC (US)

(72) Inventors: Jason Hardi, Beverly Hills, CA (US); Eric Gregory White, Tinton Falls, NJ (US)

(73) Assignee: Muzik Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,852

(22) Filed: Jan. 4, 2021

(65) Prior Publication Data

US 2021/0127194 A1 Apr. 29, 2021

Related U.S. Application Data

(63) Continuation of application No. 16/111,667, filed on Aug. 24, 2018, now Pat. No. 10,887,680, which is a continuation of application No. 15/273,248, filed on Sep. 22, 2016, now Pat. No. 10,063,956.

(60) Provisional application No. 62/221,983, filed on Sep. 22, 2015.

(51) Int. Cl.
*H04R 1/10* (2006.01)

(52) U.S. Cl.
CPC ......... *H04R 1/1008* (2013.01); *H04R 1/1016* (2013.01); *H04R 1/1041* (2013.01); *H04R 1/1066* (2013.01); *H04R 2420/07* (2013.01)

(58) Field of Classification Search
CPC ........ H04R 1/10; H04R 1/105; H04R 1/1016; H04R 5/0035; H04R 2201/10; H04R 2225/022; H04R 2460/13
USPC .................................................. 381/370–384
See application file for complete search history.

(56) References Cited

U.S. PATENT DOCUMENTS

| | | | | |
|---|---|---|---|---|
| 6,735,306 B1 * | 5/2004 | Heinz | H04R 1/1041 381/74 |
| 2005/0248717 A1 * | 11/2005 | Howell | G02C 5/001 351/41 |
| 2008/0279409 A1 | 11/2008 | Hupkes | |
| 2014/0177884 A1 | 6/2014 | Minarik et al. | |

FOREIGN PATENT DOCUMENTS

| | | |
|---|---|---|
| CN | 101669372 | 3/2010 |
| CN | 101669372 A | 3/2010 |
| CN | 102342130 | 2/2012 |
| CN | 203243499 | 10/2013 |
| CN | 103945294 | 7/2014 |
| DE | 10 2013 216 133 A1 | 2/2015 |

(Continued)

OTHER PUBLICATIONS

Second Office Action; CN Application No. 201680066412.2; dated Sep. 30, 2019; 20 pages.

(Continued)

*Primary Examiner* — Suhan Ni
(74) *Attorney, Agent, or Firm* — Duane Morris LLP

(57) ABSTRACT

An audio headset may include at least one headset earpiece including a speaker. The audio headset may include a removable ear cushion removably attached to the at least one headset ear piece. The audio headset may be configured to recognize a type of the removable ear cushion.

10 Claims, 8 Drawing Sheets

(56) References Cited

FOREIGN PATENT DOCUMENTS

| | | | |
|---|---|---|---|
| JP | 2005-110203 | A | 4/2005 |
| JP | 2009-212772 | A | 9/2009 |
| WO | WO 2008-122081 | A1 | 10/2008 |
| WO | WO 2010/099794 | A1 | 9/2010 |
| WO | WO 2010-099794 | A1 | 9/2010 |

OTHER PUBLICATIONS

Extended European Search Report, EP 16849599.2, dated May 29, 2019, 8 pages.
CN First Office Action; corresponding application No. 201680066412.2; dated Mar. 11, 2019; 21 pages.
Master & Dynamic Accessories https://www.masterdynamic.com/collections/accessories; Jan. 3, 2019.
International Search Report and Written Opinion, PCT/US2016/053124, dated Dec. 21, 2016, 9 pages.

* cited by examiner

INTERCHANGEABLE EAR CUSHIONS FOR HEADPHONES

CROSS REFERENCE TO RELATED APPLICATIONS

This application is a continuation of U.S. patent application Ser. No. 16/111,667, filed Aug. 24, 2018, which is a continuation of U.S. patent application Ser. No. 15/273,248, filed Sep. 22, 2016, which claims the benefit of U.S. Provisional Patent Application No. 62/221,983, filed on Sep. 22, 2015, the entire contents of each of which are incorporated herein by reference in their entireties.

DETAILED DESCRIPTION

Systems, methods, and devices for providing wireless headphones that are connectable to a mobile application and play back audio received from the mobile application (or other source) based on a type of ear cups of the headphones (e.g. on-ear and/or over-ear) are described.

In some embodiments, the systems and methods determine a type of ear cushion coupled to and audio headset, and play audio using playback settings associated with the determined type of ear cushion coupled to the audio headset. For example, the systems and methods may identify a type of cushion as an over-ear or on-ear cushion, and modify playback settings (e.g., equalization (EQ), bass or treble levels, and so on) or otherwise process the audio to be played back based on the type of cushion.

In some embodiments, an audio headset includes an ear cushion adapter containing a microprocessor and a driver, and an ear cushion configured to be removably attached to the ear cushion adapter. For example, the ear cushion adapter may include identification components that couple to identification components of the ear cushion when the ear cushion is removable attached to the ear cushion adapter, and the microprocessor is configured to identify a type of the ear cushion based on the coupling of the identification components of the ear cushion to the identification components of the ear cushion. As another example, the ear cushion is removably attached to the ear cushion adapter via magnets that couple to magnets of the ear cushion adapter.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and the equivalent.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Various embodiments are disclosed in the following detailed description and accompanying drawings.

Figure 1:
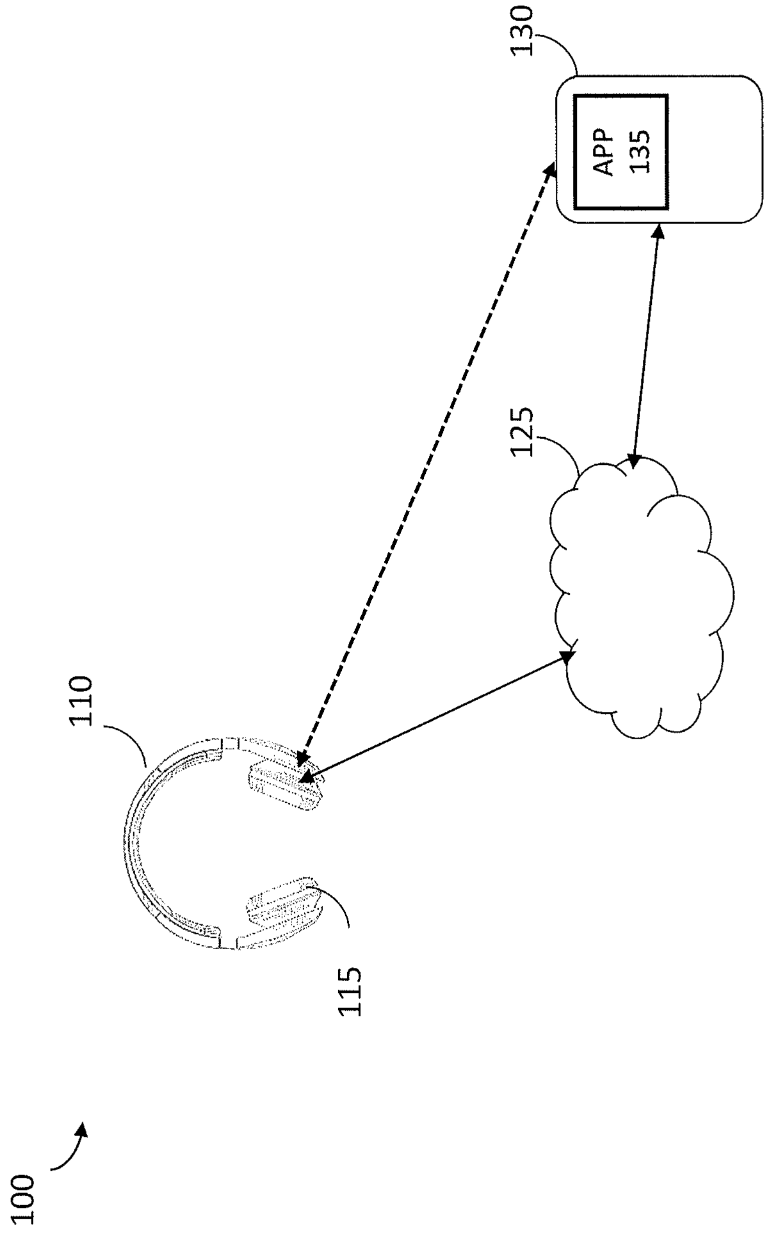
FIG. 1 is a block diagram illustrating a suitable communication environment.

As described herein, in some embodiments, the systems and methods provide headphones with interchangeable ear cushions, and modify, enhance, or otherwise adjust the playback of audio based on the type of ear cushions coupled to the headphones. FIG. 1 depicts a suitable communication environment 100, which includes an audio headset or headphones 110 associated with a mobile device 130 supporting one or more mobile applications 135, which communicate over a wireless network 125.

In some embodiments, the audio headset 110 communicates with the mobile device 130 over the network 125, in order to receive audio content (e.g., music, podcasts, voice calls, and so on) from the mobile application 135. In some embodiments, the audio headset 110 may also directly communicate with the mobile device 130 via Bluetooth® or other near-field communication protocols, which provides the audio content to the audio headset 110.

As described herein, in some embodiments, the headphones 110 may be configured with a variety of different interchangeable ear cushions (or, pads) 115, such as over-ear cushions, on-ear cushions, and so on.

Figure 2A:
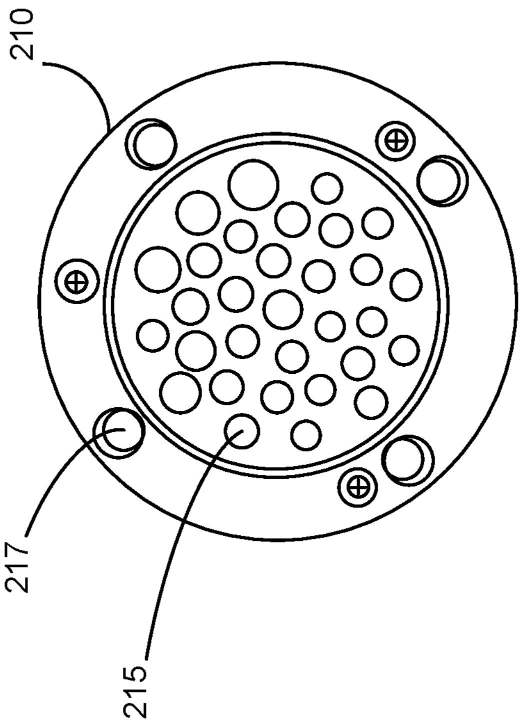
FIGS. 2A-2C illustrate various aspects of headphones with interchangeable ear cushions.

As depicted in FIG. 2A, the headphones 110 include an ear cushion adapter or frame 210 that connects or couples the headphones 110 to the ear cushions 115. The ear cushion adapter 210 may include or contain a driver 215, or other components, configured to produce sound, such as a dynamic type driver, an electrostatic driver, a micro-driver, a balanced armature driver, and so on.

The ear cushion adapter 210 also includes magnets or other attachment components 217 located on or partially integrated with the adapter 210. The magnets 217 couple to magnets fixed to an ear cushion 115 when the ear cushion is positioned to be attached (removably, or otherwise) to the adapter 210. Thus, the adapter 210 includes components that facilitate the attachment (and, un-attachment) of various interchangeable ear cushions 115 to the headphones 110.

Figure 2B:
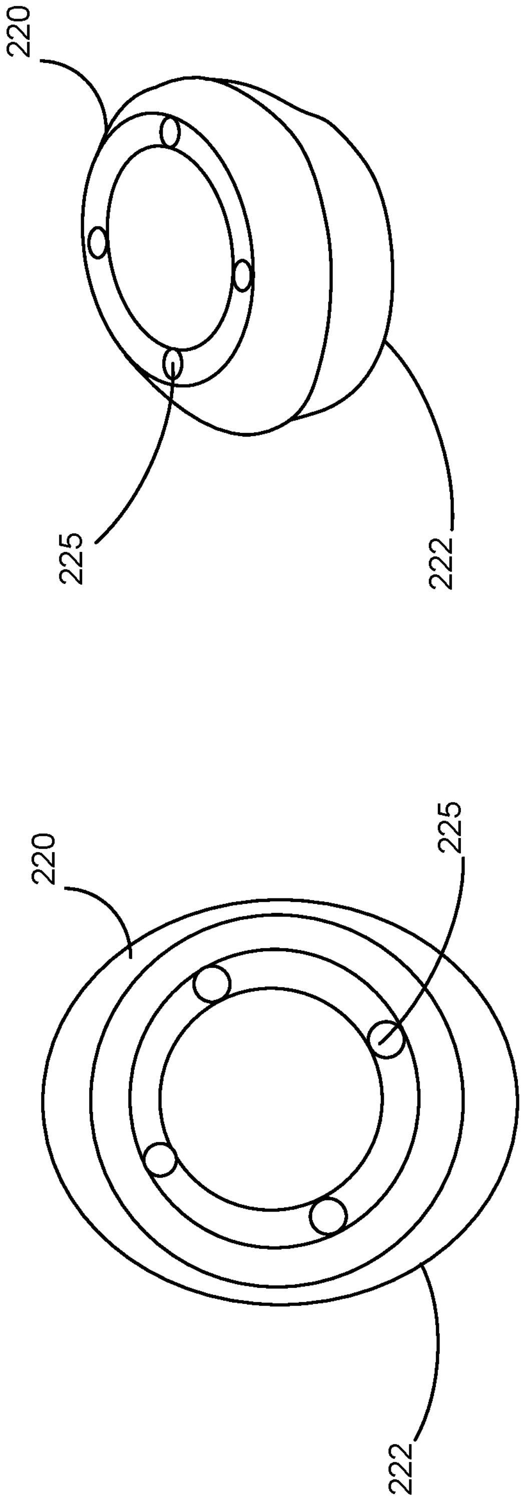

FIG. 2B illustrates various views of an over-ear cushion 220 that is configured to be removably coupled to the ear cushion adapter 210. The over-ear cushion 220 includes an over-ear pad 222 and magnets 225 located on the cushion 220 such that they match up with the magnets 217 of the adapter 210 when the over-ear cushion 220 is positioned to be attached to the adapter 210.

Figure 2C:
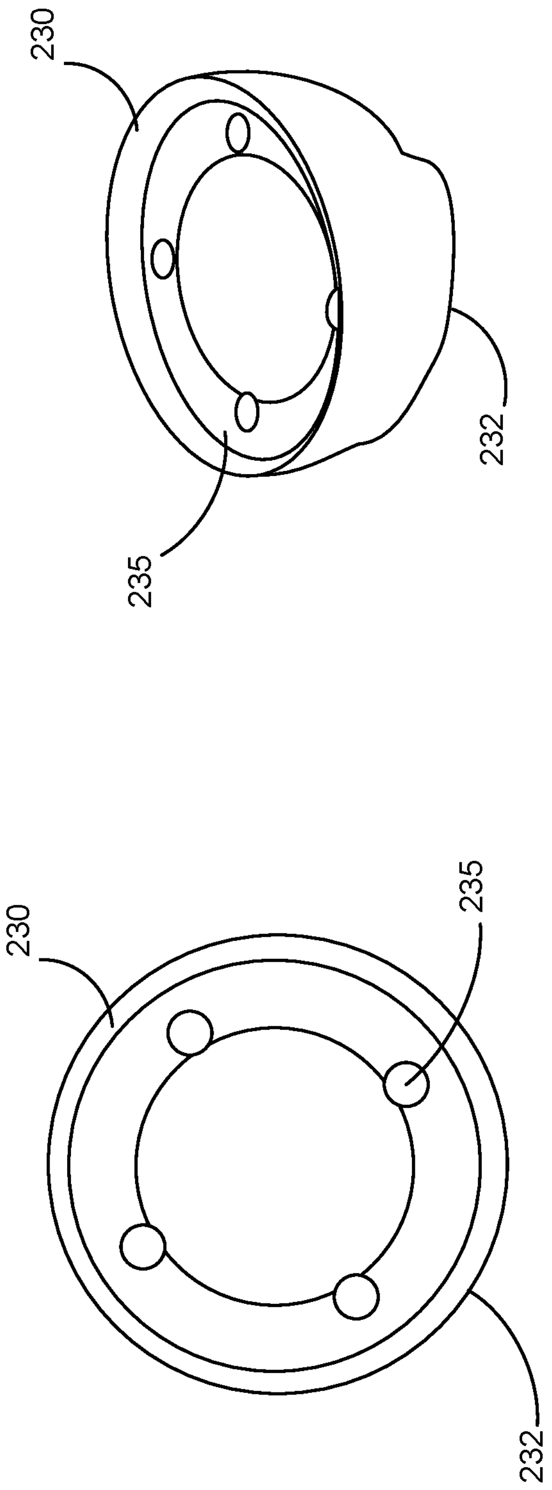

FIG. 2C illustrates various views of an in-ear cushion 230 that is configured to be removably coupled to the ear cushion adapter 210. The in-ear cushion 230 includes an in-ear pad 232 and magnets 235 located on the cushion 230 such that they match up with the magnets 217 of the adapter 210 when the in-ear cushion 230 is positioned to be attached to the adapter 210.

Figure 3:
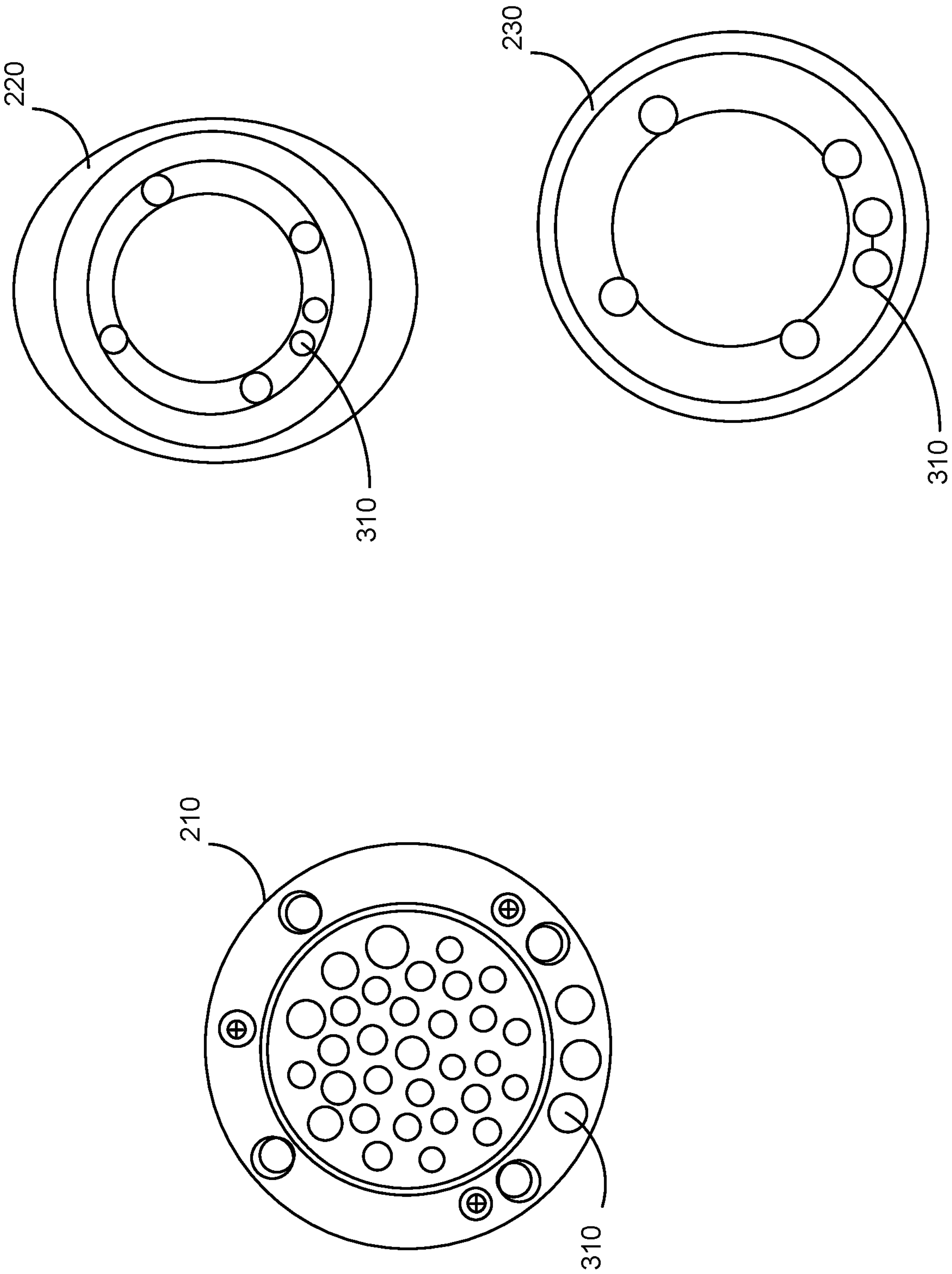
FIG. 3 is a schematic diagram illustrating components configured to identify the type of ear cushion coupled to headphones.

FIG. 3 is a schematic diagram illustrating components configured to identify the type of ear cushion 115 coupled to the headphones 110. As depicted, the ear cushion adapter 210 and the ear cushions 220, 230 include identification contacts 310 (electric contacts), that, when an ear cushion 115 is coupled to the adapter 210, facilitate an identification of the type of ear cushion 115 attached to the headphones 110.

Figure 4A:
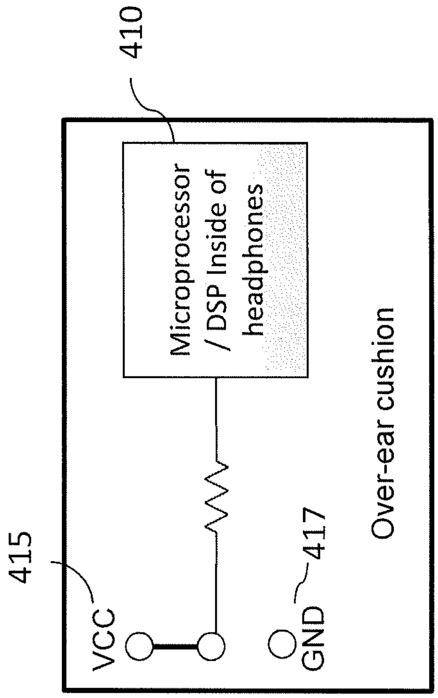
FIGS. 4A-4B are schematic diagrams illustrating identification circuits for ear cushions coupled to headphones.
Figure 4B:
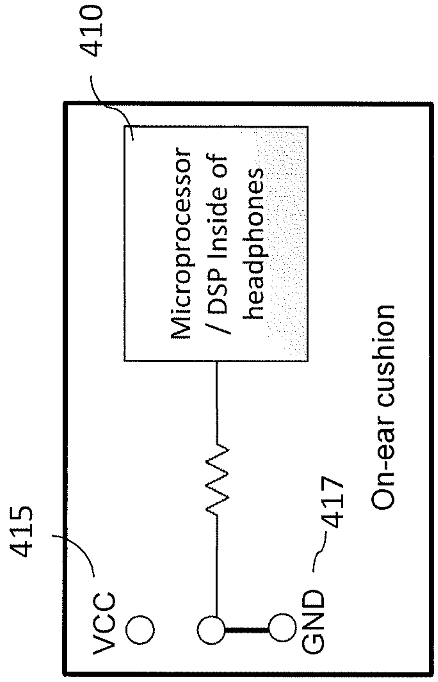

FIGS. 4A-4B are schematic diagrams illustrating identification circuits for ear cushions coupled to the headphones 110. As depicted, once a cushion is attached (e.g., via the magnetic attachment components), the identification contacts 310 of the cushion contact the identification contacts associated with supply voltage 415 or identification contacts associated with ground 417.

For example, coupling an over-ear cushion 220 to the adapter 210 will cause a pull-up to VCC 415, and coupling an on-ear cushion 230 to the adapter 210 will cause a pull-down to GND 417 on the ADC input pin of a microprocessor 410. The processor 410 identifies the cushion as an on-ear cushion 230 or an over-ear cushion 220, and adjusts, sets, or modifies audio playback settings (either directly, via the headphones 110, or indirectly, via the mobile application 135).

For example, the microprocessor 410 may adjust or set the factory pre-set DSP, tuning and/or EQ, based on the type of ear cushion 115 coupled to the headphones 110. The microprocessor may also perform other actions, such as enable/disable noise cancellation features depending on the type of ear cushion, modify the volume output range, and so on.

Figure 5:
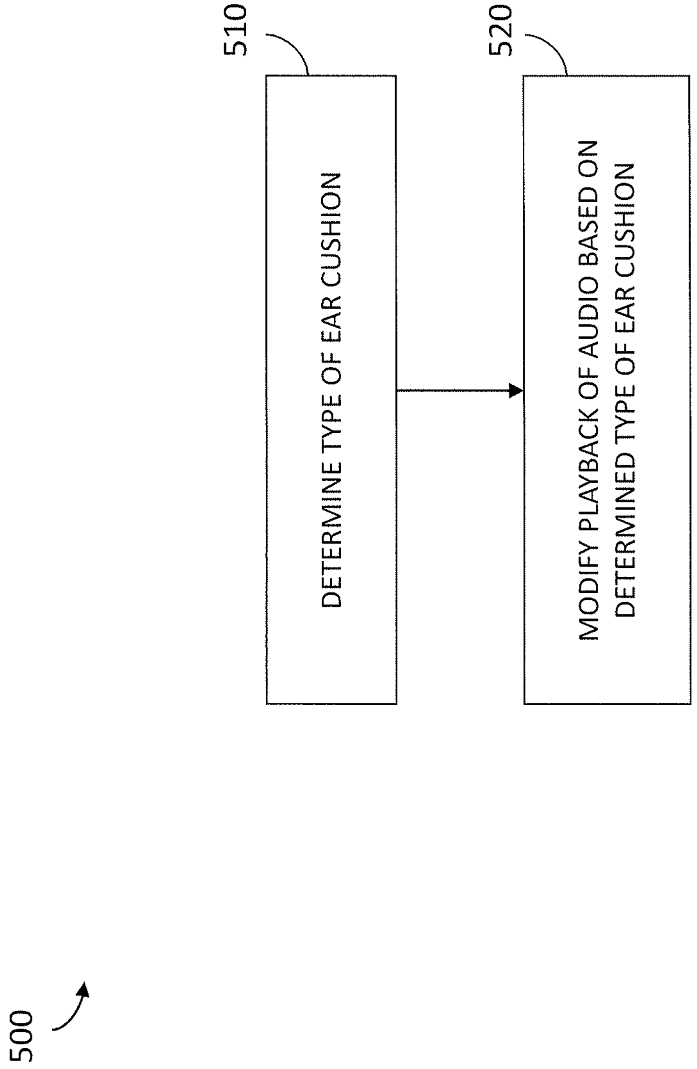
FIG. 5 is a flow diagram illustrating a method for playing audio based on a type of ear cushion coupled to headphones.

FIG. 5 is a flow diagram illustrating a method 500 for playing audio based on a type of ear cushion coupled to headphones. The method 500 may be performed by the headphones 110 and/or the mobile application 135 (or, components therein) and, accordingly, is described herein merely by way of reference thereto. It will be appreciated that the method 500 may be performed on any suitable hardware.

In operation 510, the headphones 110 determine a type of ear cushion coupled to and audio headset. For example, the microprocessor 410 with the headphones 110 may identify the type of ear cushion coupled to the headphones 110 based on a signal received from the identification contacts 310 when the ear cushion is coupled.

In operation 520, headphones 110 and/or mobile application 135 play (or, cause to be played) audio using playback settings associated with the determined type of ear cushion coupled to the audio headset. For example, the headphones 110 may identify a type of cushion as an over-ear or on-ear cushion, and modify playback settings (e.g., equalization (EQ), bass or treble levels, and so on) or otherwise process the audio to be played back based on the type of cushion.

As another example, the mobile application 135 may receive information identifying the type of ear cushion coupled to the headphones 110, and perform various modifications to playback settings associated with the audio streamed or transferred from the mobile application 135 to the headphones 110. For example, the mobile application 135 may modify playback settings based on various identifiers for the ear cushion, such as identifiers that indicate the type of ear cushion, as well as the shape of the ear cushion, the material of the ear cushion, and so on.

Examples of a Suitable Computing Environment

Figure 6:
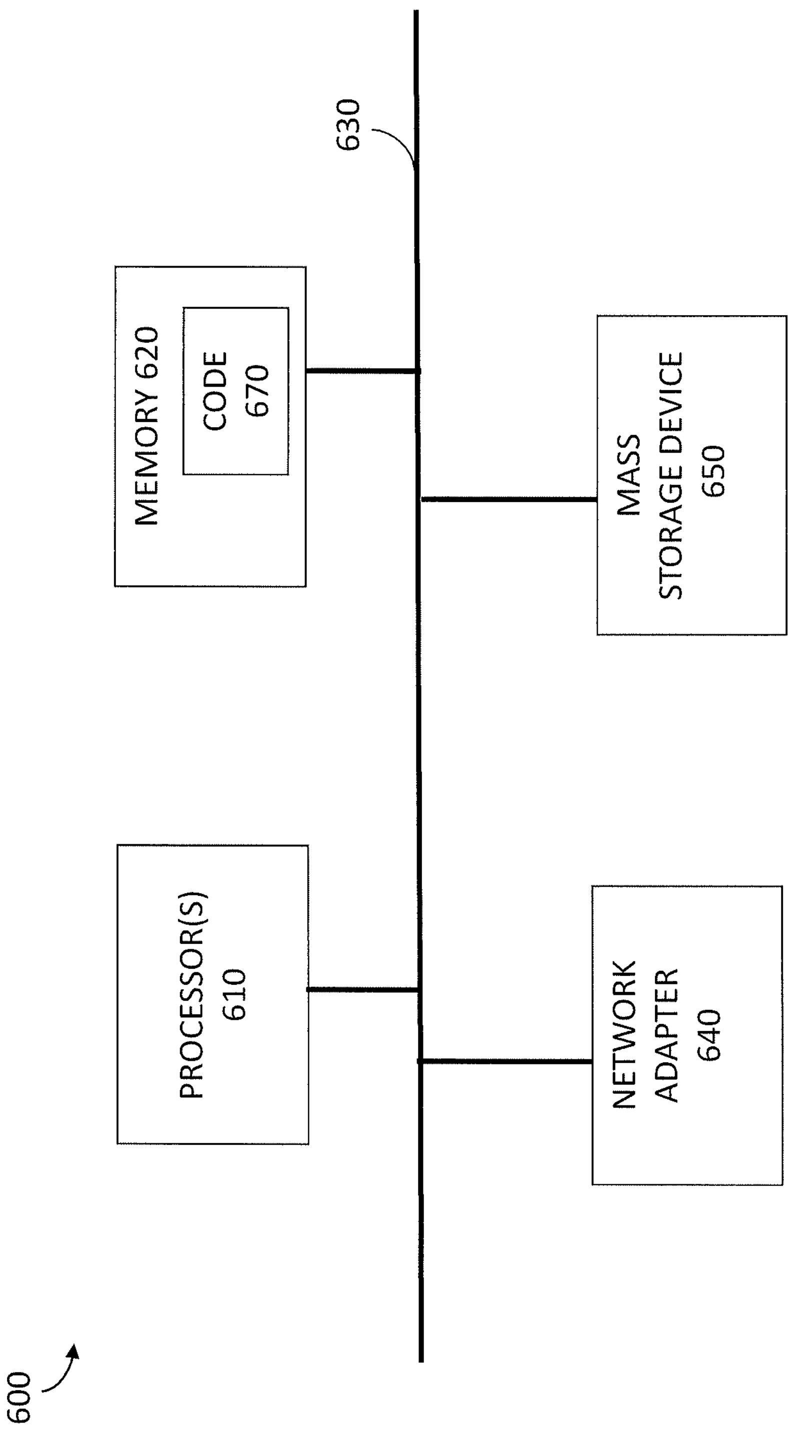
FIG. 6 is a block diagram illustrating an example architecture of a computing device.

FIG. 6 illustrates a high-level block diagram showing an example architecture of a computer 600, which may represent any electronic device, such as a mobile device or a server, including any node within a cloud service as described herein, and which may implement the operations described above. The computer 600 includes one or more processors 610 and memory 620 coupled to an interconnect 630. The interconnect 630 may be an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computer 600 and, thus, control the overall operation of the computer 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 620 is or includes the main memory of the computer 600. The memory 620 represents any form of random access memory (RAM), read-only memory (ROM), flash memory, or the like, or a combination of such devices. In use, the memory 620 may contain code 670 containing instructions according to the techniques disclosed herein.

Also connected to the processor(s) 610 through the interconnect 630 are a network adapter 640 and a mass storage device 650. The network adapter 640 provides the computer 600 with the ability to communicate with remote devices over a network and may be, for example, an Ethernet adapter. The network adapter 640 may also provide the computer 600 with the ability to communicate with other computers.

The code 670 stored in memory 620 may be implemented as software and/or firmware to program the processor(s) 610 to carry out actions described above. In certain embodiments, such software or firmware may be initially provided to the computer 600 by downloading it from a remote system through the computer 600 (e.g., via network adapter 640).

CONCLUSION

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

These computer program instructions may also be stored in a computer readable medium that can direct a computer, other programmable data processing apparatus, or other devices to function in a particular manner, such that the instructions stored in the computer readable medium produce an object of manufacture including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

What is claimed:

1. An ear cushion comprising:

a first surface configured to removably attach to an audio headset comprising a speaker, wherein the first surface is configured to be removably attached to the audio headset by an end user of the audio headset;

a second surface configured to contact an ear of a user of the audio headset when the ear cushion is removably attached to the audio headset; and an identification component configured to identify a type of the ear cushion among a plurality of types of the ear cushion, the type of the ear cushion configured for use to modify playback of audio through the speaker based on the type of the ear cushion.

2. The ear cushion of claim 1 further comprising: an attachment component on the first surface configured to facilitate removable attachment of the ear cushion to the audio headset.

3. The ear cushion of claim 1 wherein the type of the ear cushion is configured for use to modify equalization settings for the playback of the audio through the speaker based on the type of the ear cushion.

4. The ear cushion of claim 1 further comprising: an identification contact on the first surf ace configured to identify the type of the ear cushion and configured to removably attach the first surface to the audio headset.

5. The ear cushion of claim 1 wherein the first surface comprises an opening configured to allow transmission of an audio output of the speaker of the audio headset through the ear cushion to the ear of the user.

6. The ear cushion of claim 1 wherein the first surface comprises an indentation that is configured to align the ear cushion with an ear cushion adapter of the audio headset.

7. An ear cushion comprising:

a first surface configured to removably attach to an audio headset comprising a speaker, wherein the first surface is configured to be removably attached to the audio headset by an end user of the audio headset;

a second surface configured to contact an ear of a user of the audio headset when the ear cushion is removably attached to the audio headset;

one or more attachment components on the first surface configured to facilitate removable attachment of the ear cushion to the audio headset; and an identification component configured to identify a characteristic of the ear cushion, the characteristic configured for use to modify playback of audio through the speaker.

8. The ear cushion of claim 7 wherein the characteristic of the ear cushion comprises a shape of the ear cushion.

9. The ear cushion of claim 7 wherein the characteristic of the ear cushion comprises a material from which the ear cushion is formed.

10. An ear cushion comprising:

a first surface configured to removably attach to an audio headset comprising a speaker, wherein the first surface is configured to be removably attached to the audio headset by an end user of the audio headset;

a second surface configured to contact an ear of a user of the audio headset when the ear cushion is removably attached to the audio headset;

an identification component configured to identify a type of the ear cushion for generation of a signal to a mobile application to modify playback of audio through the speaker based on the type of the ear cushion.

* * * * *